United States Patent [19]
Ogawa

[11] Patent Number: 6,164,427
[45] Date of Patent: Dec. 26, 2000

[54] PARKING APPARATUS FOR CONTINUOUSLY VARIABLE TRANSMISSION

[75] Inventor: Hiroshi Ogawa, Tokyo, Japan

[73] Assignee: Fuji Jukogyo Kabushiki Kaisha, Tokyo, Japan

[21] Appl. No.: 09/407,423

[22] Filed: Sep. 29, 1999

[30] Foreign Application Priority Data

Sep. 30, 1998 [JP] Japan .................................. 10-277879

[51] Int. Cl.[7] ........................... B60K 41/26; F16H 55/52
[52] U.S. Cl. ..................... 192/219.5; 74/473.1; 192/224; 474/8
[58] Field of Search ................................ 192/219.5, 224; 74/473.15, 473.3, 411.5, 473.1; 474/37, 38, 8, 69

[56] References Cited

U.S. PATENT DOCUMENTS

| | | | |
|---|---|---|---|
| 4,487,302 | 12/1984 | Morimoto et al. | 192/219.5 |
| 4,645,046 | 2/1987 | Takano et al. | 192/219.5 |

FOREIGN PATENT DOCUMENTS

| | | |
|---|---|---|
| 58-207571 | 12/1983 | Japan . |
| 330540 | 4/1991 | Japan . |
| 5322043 | 12/1993 | Japan . |
| 2547900 | 5/1997 | Japan . |

*Primary Examiner*—Rodney H Bonck
*Attorney, Agent, or Firm*—Martin A. Farber

[57] ABSTRACT

A parking apparatus of a continuously variable transmission includes a manual shaft vertically provided at the front of a primary shaft for driving both parking mechanism and manual valve operating mechanism. The parking mechanism comprises a lock arm, a parking rod, a parking pawl and a parking gear provided in a secondary pulley. The parking rod is rigidly fitted to a spacer and also it is slidably fitted to a cam. The cam abuts against the spacer by the biasing force of a spring. When a select lever is not positioned at a parking range, the spacer slides on a supporter so as to disengage the parking pawl with the parking gear. When the select lever is positioned at the parking range, the cam pushes upward the parking pawl so as to engage the parking pawl with the parking gear.

9 Claims, 10 Drawing Sheets

VEHICLE FRONT →

⇐ FRONT

2: MANUAL SHAFT
4: CABLE
11: PARKING MECHANISM
12: MANUAL VALVE OPERATING MECHANISM
18: LOCK ARM
19: PARKING ROD
20: SUPPORTER
21: PARKING PAWL
23: SPACER
23a: CAM
30: SECONDARY PULLEY
31: PARKING GEAR

VEHICLE FRONT →

PARKING APPARATUS FOR CONTINUOUSLY VARIABLE TRANSMISSION

BACKGROUND OF THE INVENTION

1. Field of the Invention

The present invention relates to a parking apparatus for a continuously variable transmission and, more specifically to, a parking apparatus capable of operating a parking mechanism and manual valve operating mechanism with a single driving shaft.

2. Prior Art

In recent years, increasing number of vehicles are equipped with so-called continuously variable transmission in which the transmission speed ratio is changed automatically by means of changing the pulley diameter according to operating conditions. Generally, a vehicle incorporating the continuously variable transmission has a select lever in the passenger compartment so as to obtain an automatic speed change according to range positions selected by the select lever. The range positions include a forward range (D), a reverse range (R), a neutral range (N) and a parking range (P). When the select lever is positioned at the parking range, the continuously variable transmission is constituted in such a manner that its secondary pulley is locked. Specifically, when the select lever is operated, a manual shaft is rotated through a cable interconnecting between the transmission and select lever. A rod and linkage mechanism connected with the manual shaft operates a parking mechanism so as to lockup rotation of the secondary pulley.

The cable interconnecting between the continuously variable transmission and select lever, in case of where the continuously variable transmission is mounted transversely, is connected with the top or front surface of the transmission but not with the side surface thereof because the side face is occupied with a differential gear device and a constant-velocity universal joint. Further, it is desirable from the view point of the reduction of friction and the improvement of endurance that the cable is arranged among components such that the bending radius is as large as possible. To realize this, the manual shaft is preferably disposed at a remote place from the cable connecting point on the select lever. Further, similarly it is preferable that the rod and linkage mechanism for operating the parking mechanism is disposed at a remote position from the select lever.

For example, in the parking mechanism disclosed in Japanese Patent Application Laid-open No. Toku-Kai-Hei 5-322043, a rotating rod for the parking mechanism is disposed on the front upper surface of the transmission. In this case, a connecting rod connected with the rotating rod is provided in the orthogonal direction of the engine crank shaft in a dead space under the engine output shaft. Further, the connecting rod is engaged at other end thereof with a lever and the lever operates a parking pawl so as to lock one of parking gears with its pawl section.

Further, Examined Japanese Patent Application No. Toku-Kou-Hei 3-30540 discloses a construction in which a parking lock shaft is disposed at the front of the transmission. Also in this disclosure, the parking lock shaft is disposed at a remote position from the select lever.

On the other hand, the select lever is interlocked with a manual valve for changing over hydraulic pressure of a clutch and brake of a forward and reverse changeover apparatus. Studying the change-over mechanism of the manual valve from the view point of the interior structure of the transmission, in case where the manual valve is accommodated in an oil pan disposed under the transmission together with miscellaneous control valves, it is necessary to arrange a shaft for operating the manual valve in a space close to the manual valve and not interfering with other power drive shafts. Generally, the transmission thus constituted has a narrow range of choice in incorporating the shaft. Especially, since a transversely mounted continuously variable transmission has four drive shafts (primary shaft, secondary shaft, drive pinion and differential gear), this kind transmission has much more difficulty than a conventional planetary type automatic transmission.

To overcome this difficulty, Registered Japanese Utility Model Application No. 2547900 proposes a technique in which the manual shaft is divided into two shafts provided in parallel with each other. In this case, the manual shafts can be accommodated in a limited space between drive shafts. Further, in another disclosure, there is a technique in which the manual valve is disposed on the upper surface of the transmission separately from the control valve body. According to this technique, the manual shaft does not penetrate through the transmission case up to the oil pan.

In case where the manual shaft can not be disposed in a position appropriate for connecting the cable due to the problem of the interior structure of the transmission, there is a technique wherein the cable is connected to the manual shaft through a parallel link provided on the transmission. However, this method has such problems as a malfunction of the link mechanism, a low positioning accuracy in operating the manual valve and others.

Since the continuously variable transmission can not accommodate a parking mechanism around the primary shaft because of the structural reason of the transmission, the parking gear is mounted on the secondary pulley. In this case, as a distance between the parking gear and manual shaft is smaller, designing of the parking mechanism becomes easy. Accordingly, it is desirable to reduce that distance as far as possible. For example, Japanese Patent Application Laid-open No. Toku-Kai-Shou 58-207571 proposes a parking lock mechanism in which a cam guided by a sleeve is formed at the end of a rod slidably operative by the manual shaft and the cam pushes up a pawl in the direction of locking the parking gear. If the distance between the parking gear and manual shaft is unduly large, the following mechanical problem is caused.

That is, if the distance between both is too large, the lever provided between the parking gear and manual shaft is elongated and the offset amount of the rod becomes increases. This brings about a large space for swinging of the lever and a lack in the parking force. Further, a parking mechanism in which the rod is arranged in the direction of the secondary shaft and the pawl is operated like a seesaw according to rotation of the manual shaft, can be considered but this type of mechanism has a problem in that the width of the transmission increases due to a space for the reciprocating motion of the rod, this resulting in an increase of the size of the overall transmission.

That is, although thus constituted parking apparatus and manual valve changeover apparatus are interlockingly operated by one select lever, these apparatuses are not constituted in such a manner that they are driven by a single driving shaft. That is, the respective mechanisms for finally actuating these apparatuses are constituted independently from each other, this resulting in an increase of the number of components and difficulty in assembling the apparatuses.

The parking mechanism disclosed in Toku-Kai-Hei 5-322043 utilizes a complicated mechanism comprising connecting rods and levers. Additionally, since this continuously variable transmission has a four-shafts construction, it is very difficult to incorporate the parking mechanism into the transmission.

Further, since the construction disclosed in Toku-Kou-Hei 3-30540 has an output shaft below the crank shaft of the engine, normally the secondary pulley is arranged in such a state as dipping in lubrication oil and as a result, agitation loss of the pulley increases. To avoid this, it is considered that the secondary pulley is arranged at a position rotated counterclockwise 90 degrees but this construction has a defect that a frontal clash space on an impact is occupied by the control valve.

SUMMARY OF THE INVENTION

It is a primary object of the present invention to provide a parking apparatus for a continuously variable transmission capable of operating a parking mechanism and a manual valve operating mechanism with a single driving shaft. It is another object of the present invention to provide a parking apparatus having a small number of components.

To achieve the above-identified objects, the parking apparatus of the present invention comprises a manual shaft interconnected with said select lever and vertically provided on substantially the same plane as that formed by a primary pulley and a secondary pulley of the transmission, a parking mechanism provided at the upper portion of the manual shaft and on substantially the same plane as that formed by the primary pulley and the secondary pulley for locking up the secondary pulley and a manual valve operating mechanism provided at the lower portion of the manual shaft for changing over a manual valve.

In particular, the parking mechanism includes a lock arm connected to the manual shaft and swinging in accordance with the rotation of the manual shaft, a parking rod pivotally connected with the lock arm and reciprocating in the orthogonal direction of a center axis of the secondary pulley in accordance with the swing motion of the lock arm, a spacer having a small diameter and rigidly fitted over the parking rod, a cam tapered on one side thereof, having a large diameter and slidably fitted over the parking rod, a supporter for supporting the spacer and the cam so as to restrict a radial motion of the spacer and the cam, a spring mounted on the parking rod for biasing the cam toward the spacer, a pivot provided in parallel with an axis of a secondary pulley and a parking pawl rocking around the pivot. The parking pawl rides on the spacer when the select lever is positioned at a range other than a parking range so as to be disengaged with a parking gear provided in the secondary pulley and rides on the cam when the select lever is positioned at the parking range so as to be engaged with the parking gear.

BRIEF DESCRIPTION OF THE DRAWINGS

FIG. 1b is a top view of a front part of the vehicle shown in FIG. 1a;

FIG. 4b is a partially enlarged, cross sectional view taken along a line A—A of FIG. 4a;

FIG. 14b is a plane view of the parking rod shown in FIG. 14a.

DESCRIPTION OF PREFERRED EMBODIMENTS

Figure 1A:
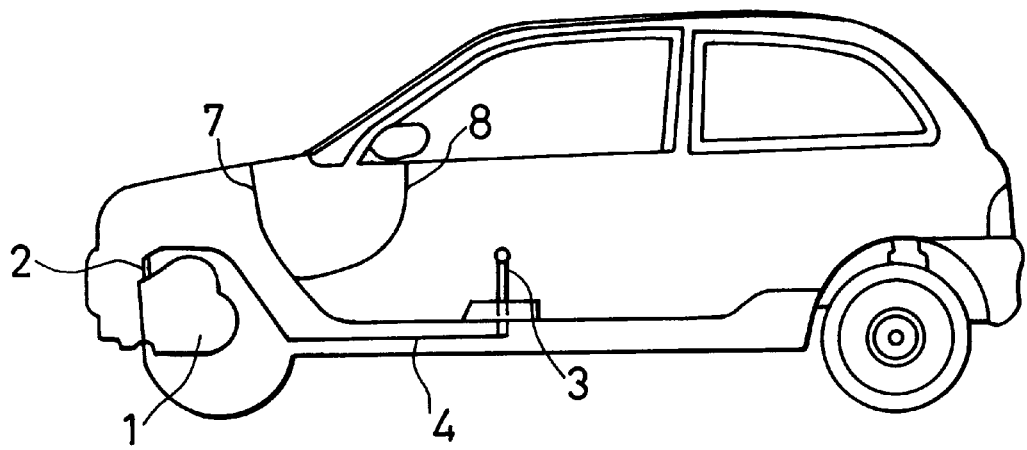
FIG. 1a is a side view of a vehicle incorporating a continuously variable transmission equipped with a parking apparatus according to a first embodiment of the present invention.
Figure 1B:
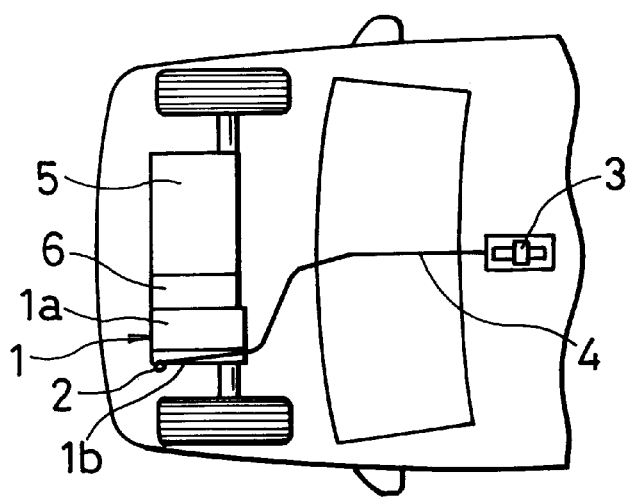

Referring now to FIG. 1, numeral 1 denotes a continuously variable transmission in which a parking apparatus is incorporated. Numeral 2 denotes a manual shaft disposed at the front portion of the continuously variable transmission 1. The manual shaft 2 is connected with a select lever 3 through a cable 4. That is, in the parking apparatus, the manual shaft 2 is disposed at a most preferable, remotest position from the select lever 3 and as a result it is possible to introduce a cable design having a large bend radius, thereby the life of the cable 4 can be elongated and the friction can be reduced.

The continuously variable transmission 1 comprises a main case 1a and a side case 1b. When the parking apparatus is incorporated in the transmission 1, first it is installed on the side case 1b side and then is built in the transmission 1 by combining both cases 1a and 1b. That is, when the side case 1b is combined with the main case 1a, at the same time the parking apparatus is assembled. Further, numeral 5 denotes an engine, numeral 7 denotes a toe board, and numeral 8 denotes a dash board.

Figure 2:
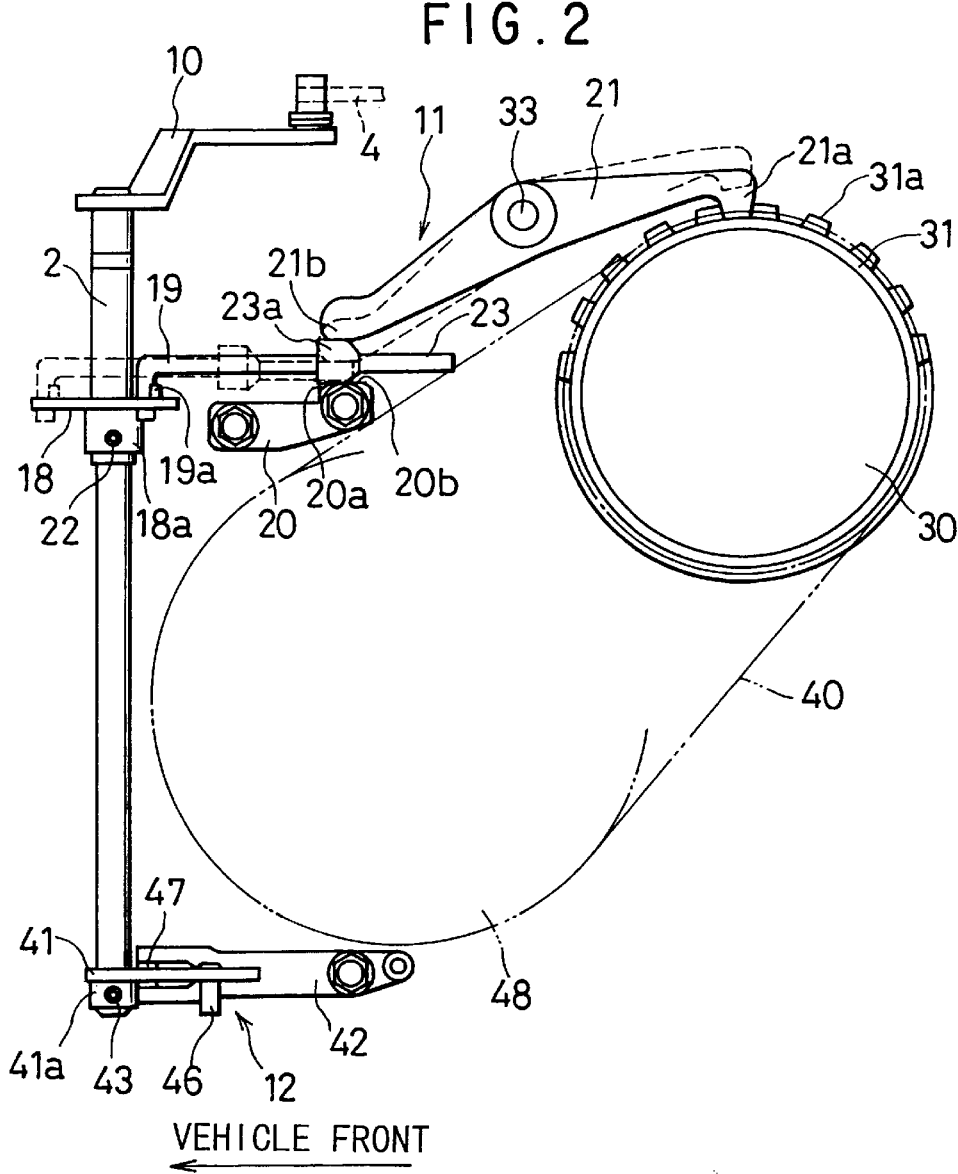
FIG. 2 is a side view of a parking apparatus according to the present invention as viewed from a side case of a continuously variable transmission.
Figure 3:
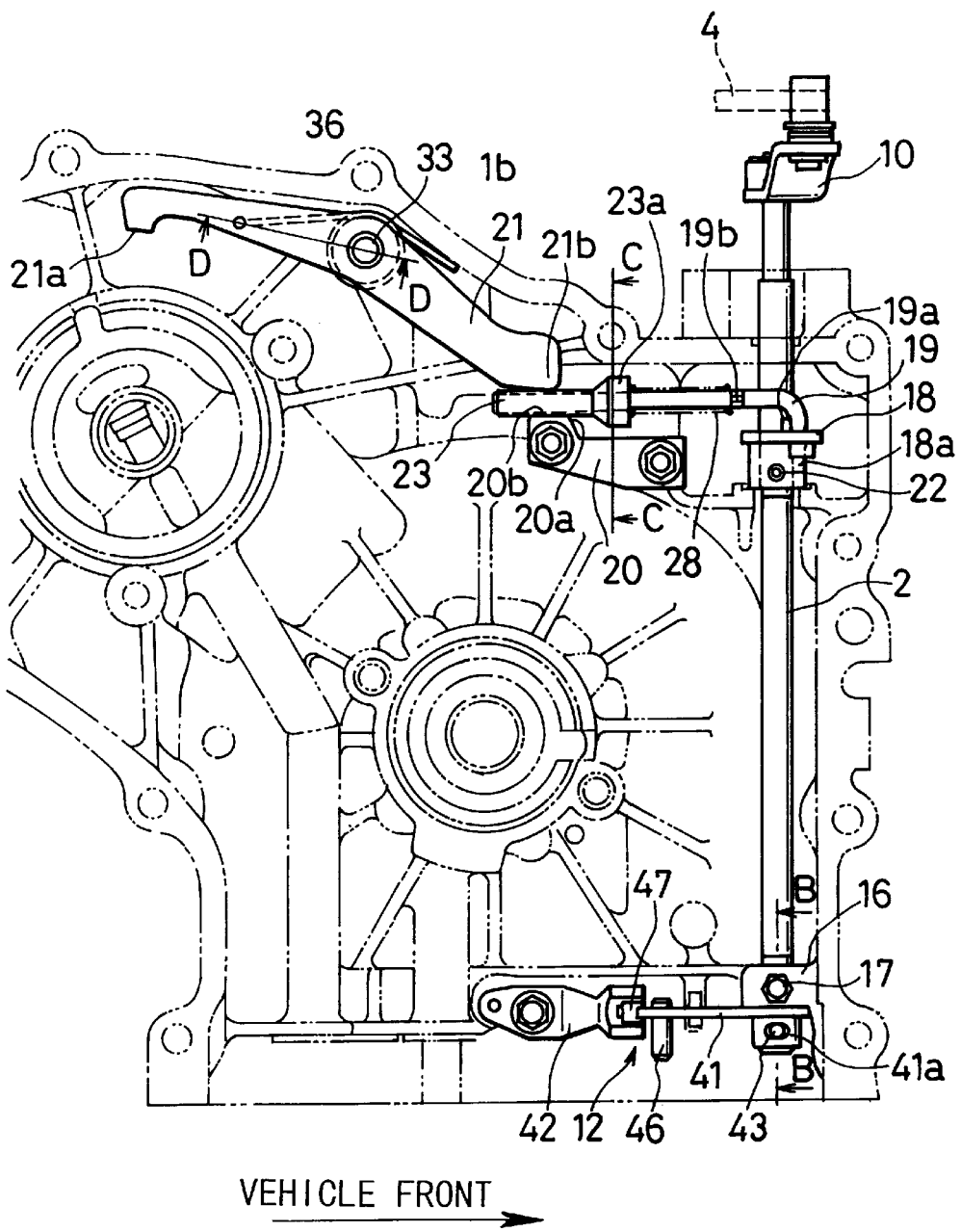
FIG. 3 is a side view of a parking apparatus according to the present invention as viewed from a main case of a continuously variable transmission.

As illustrated in FIGS. 2 and 3, the parking apparatus comprises a manual shaft 2 connected with the cable 4 through a driving arm 10, a parking mechanism 11 driven by the manual shaft 2 and a manual valve operating section 12. This single manual shaft 2 performs two operations, a secondary pulley lockup operation at the parking range and a manual valve operation according to the range selected by the select lever 3, thereby the number of components can be reduced and therefore an improvement of reliability and a reduction of manufacturing cost can be obtained.

The connecting portion between the driving arm 10 and cable 4 is located closer to the center of the vehicle than the connecting portion between the driving arm 10 and manual shaft 2 and further the driving arm 10 is oriented in the rearward direction of the vehicle. Accordingly, the driving arm 10, since it is not projected outside of the transmission 1, does not interfere with other surrounding components and its operating range is not restricted. Further, since the cable 4 is directly connected with the manual shaft 2, there is small plays between components, this providing a vehicle driver with "rigid" or "crisp" feeling in operating the select lever 3.

Figure 4A:
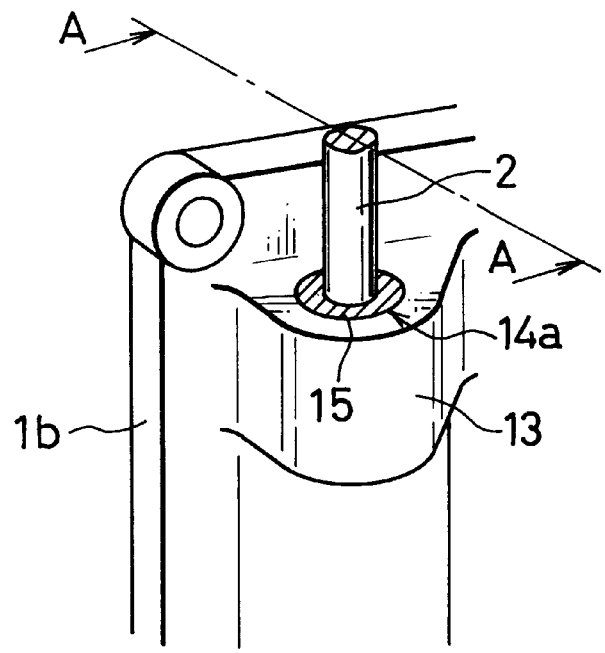
FIG. 4a is a partially enlarged, perspective view showing a manual shaft incorporated in a side case.
Figure 4B:
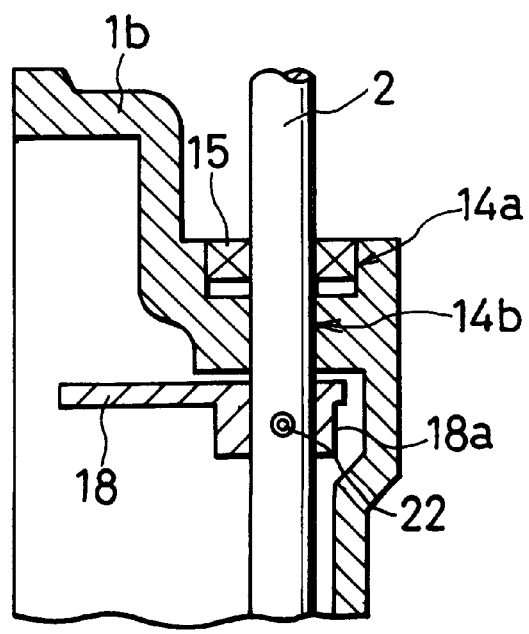

The manual shaft 2 is mounted on the front side edge of the side case 1b of the continuously variable transmission 1 in such a manner as extending vertically. As shown in FIGS. 4a and 4b, a boss section 13 is provided on the upper portion of the side edge of the side case 1b to accommodate and support the manual shaft 2. The boss section 13 is provided with a vertical through hole 14b for rotatably supporting the manual shaft 2. Further, there is provided a counter bore 14a on the upper surface of the boss section 13 for accommodating an oil seal 15.

On the other hand, as shown in FIG. 3, a boss section 16 is projected sideways from the lower part of the side case 1b and a shaft hole 16a is provided for supporting the lower part of the manual shaft 2.

Figure 5:
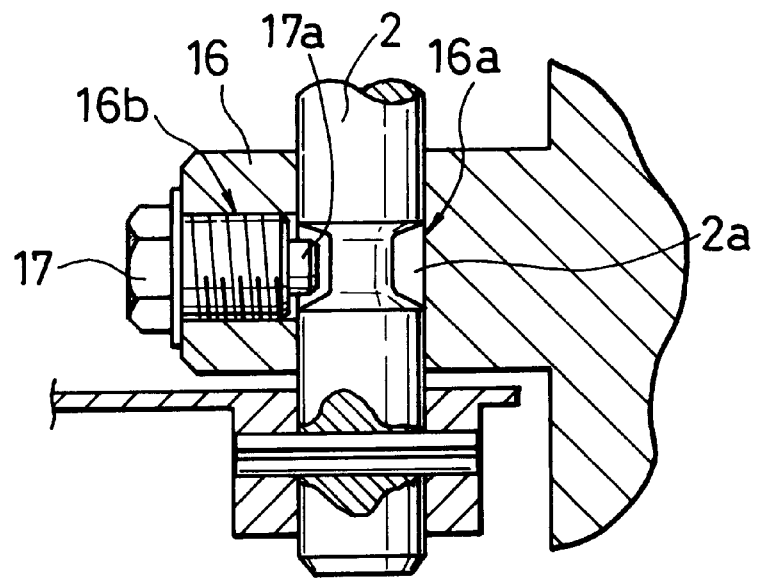
FIG. 5 is a partially enlarged, cross sectional view taken along a line B—B of FIG. 3.

On the end surface of the boss section 16, as shown in FIG. 5, a tapped hole 16b is horizontally threaded through to the shaft hole 16a and a bolt 17 having a small diameter portion 17a at the end thereof is threaded into the tapped hole 16b. On the other hand, a groove 2a is circumferentially formed on the manual shaft 2 to accommodate the small diameter portion 17a. When the bolt 17 is threaded into the tapped hole 16b, the small diameter portion 17a enters into the groove 2a so as rotatably to support the manual shaft 2. Thus, the manual shaft 2 is prevented from coming out in the axial direction.

Next, describing a parking mechanism 11 with reference to FIG. 2, the parking mechanism 11 comprises a lock arm 18 secured to the manual shaft 2, a parking rod 19 rotatably connected with the lock arm 18, a supporter (supporting means) 20 for slidablly supporting the parking rod 19 and a parking pawl 21 performing a rocking movement according to the sliding motion of the parking rod 19 for locking up a secondary pulley 30 by engaging a pawl 21a of the parking pawl 21 with a parking gear 31 integrally formed with the secondary pulley 30. The feature of this parking mechanism 11 is that it is disposed in a vacant space above a primary pulley 48 interconnected with a secondary pulley 30 by a belt (power transmitting means) 40. That is, in the parking mechanism 11, the parking gear 31 is provided on the periphery surface of the secondary pulley 30. As a result, since the components constituting the parking mechanism are arranged substantially on the same line, additional components such as a lever are not necessary to use, and therefore it is possible to design the parking mechanism with a small number of components.

Figure 6:
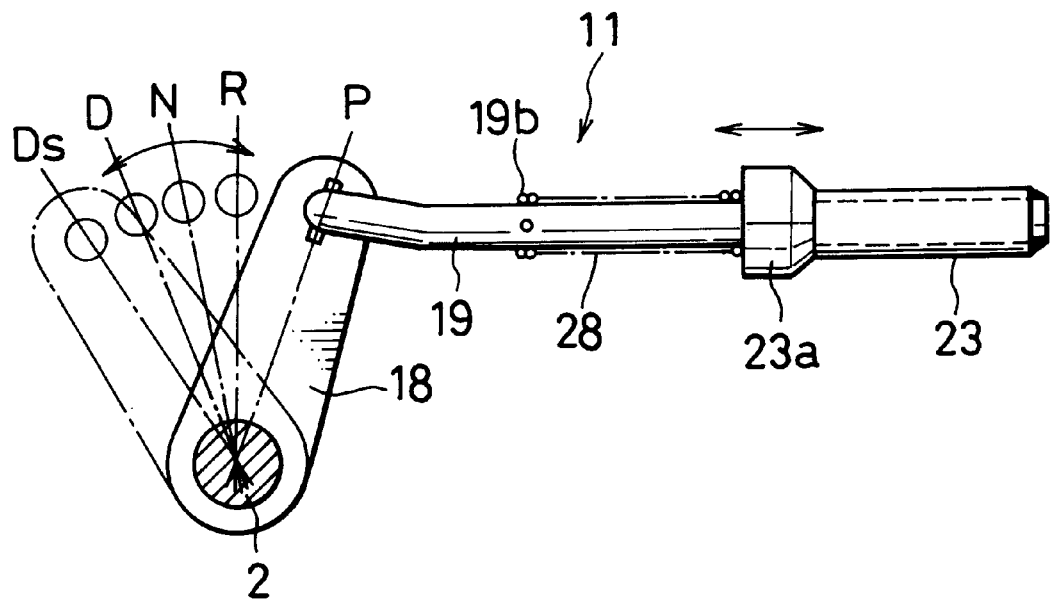
FIG. 6 is an explanatory view showing an operation of a lock arm and a parking rod.

As shown in FIGS. 2 and 3, the lock arm 18 is secured at a boss section 18a thereof to the manual shaft 2 by a spring pin 22. Further, as shown in FIG. 6, the lock arm 18 swings in accordance with the rotation of the manual shaft 2 to travel across respective range positions (P, R, N, D and Ds) selected by the select lever 3. The lock arm 18 is rotatably connected at the end thereof with the parking rod 19 and as it swings the parking rod 19 travels reciprocatingly in the orthogonal direction relative to the axis of the secondary pulley. Thus, rotational motion of the manual shaft 2 is converted into reciprocating movement by the help of the lock arm 18 and parking rod 19.

Figure 7A:
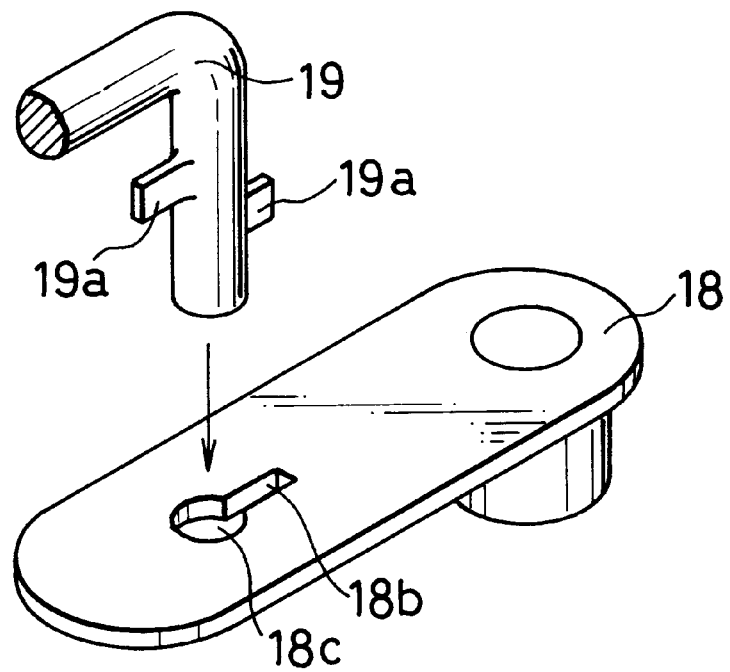
FIG. 7a is a perspective view showing a state of a lock arm and a parking rod before installation.
Figure 7B:
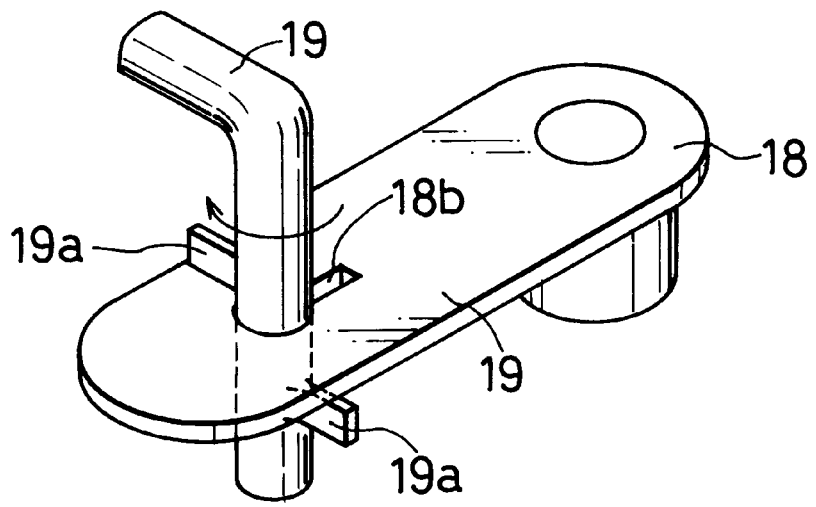
FIG. 7b is a perspective view showing a state of a lock arm and a parking rod after installation.

Next, describing the connecting structure between the lock arm 18 and parking rod 19 with reference to FIGS. 7a and 7b, first two protrusions 19a, 19a are formed on the parking rod 19 being spaced apart by more than the plate thickness of the lock arm 18. On the other hand, there is provided a rod hole 18c having a notch 18b for allowing the protrusion 19a to pass therethrough on the lock arm 18. The protrusions 19a, 19b prevent the parking rod 19 from coming out of the lock arm 18 by rotating the parking rod 19 after passing through the rod hole 18c as shown in FIG. 7b. In this case, the diameter of the rod hole 18c is slightly larger than that of the parking rod 19 to allow a swing motion of the parking rod 19.

As shown in FIGS. 3 and 6, a cylindrical spacer 23 having a small diameter is fitted over from the end of the parking rod 19 and secured thereto by welding. On the other hand, a tapered cylindrical cam 23a having a large diameter is loose fitted to the parking rod 19 and is biased by a spring 28 in the direction of the spacer 23. The spacer 23 is slidably supported by the supporter 20 which is secured to the side case 1b.

Figure 8:
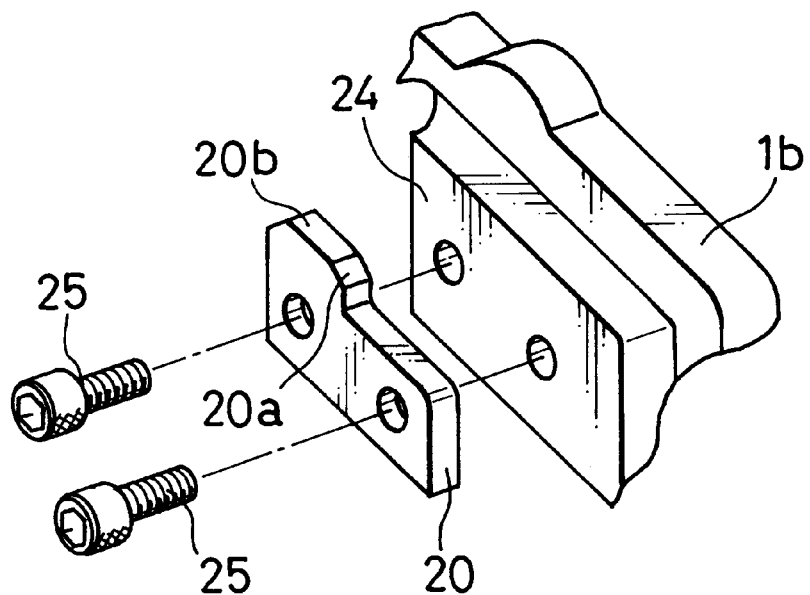
FIG. 8 is an exploded perspective view showing a structure of a supporter.
Figure 9:
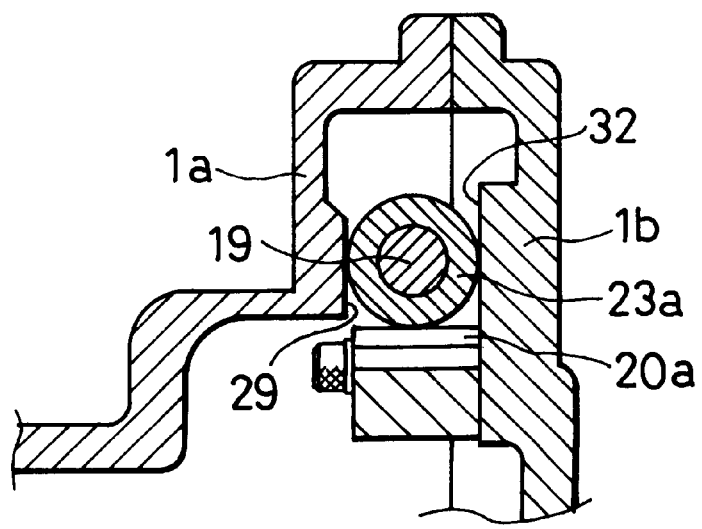
FIG. 9 is an enlarged cross sectional view taken along a line C—C of FIG. 3.

As shown in FIG. 8, the supporter 20 is formed by a slope 20a and a supporting surface 20b and is secured to an mount 24 formed in the side case 1b by bolts 25, 25. FIG. 9 shows a state of the cam 23a riding on the supporting surface 20b of the supporter 20. In this state, motion of the cam 23a is restricted in its radial direction between a guide surface 29 formed in the main case 1a and a guide surface 32 formed in the side case 1b. The guide surfaces 29, 32 are beforehand subjected to hardening such alumite treatment so as to raise abrasion resistance. Thus, the cam 23a slides on the supporter 20 while being guided by these guide surfaces 29, 32 and surely rides on the supporting surface 20b.

Figure 10:
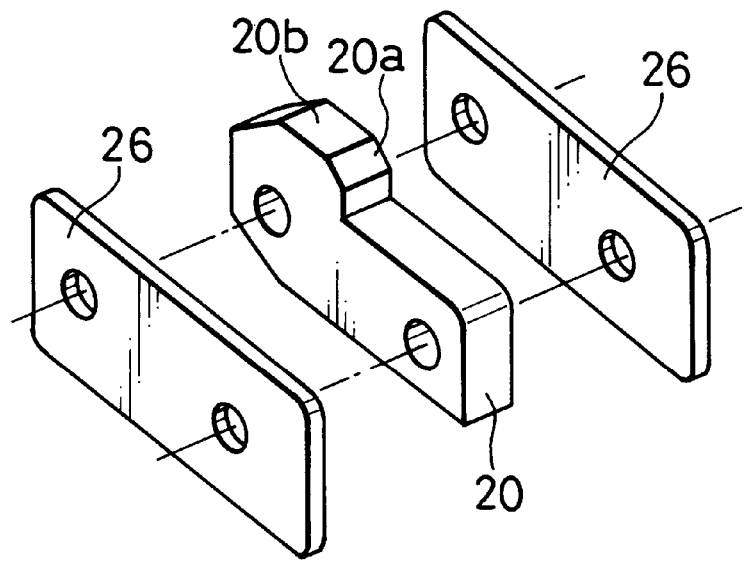
FIG. 10 is an exploded perspective view showing an example of variations of a supporter.
Figure 11:
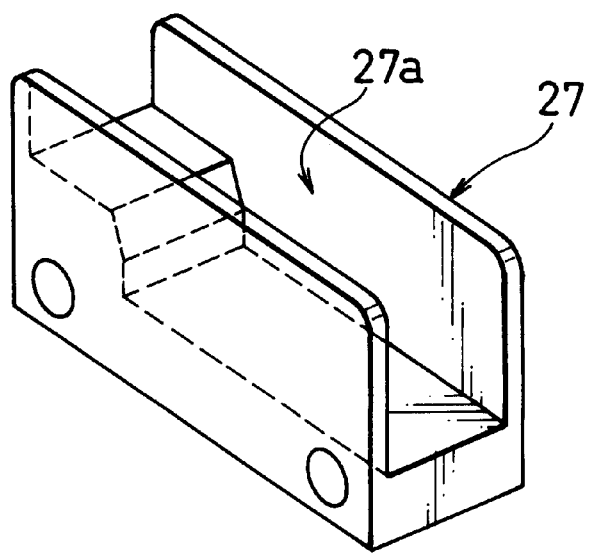
FIG. 11 is a perspective view showing another example of variations of a supporter.

It should be appreciated that the supporting structure of the cam 23a is not limited to that shown in FIGS. 8 and 9. For example, as shown in FIG. 10, guide plates 26, 26 are attached to both sides of the supporter 20 so as to guide the cam 23b. In this case, the guide plates 26 are beforehand subjected to soft nitriding so as to raise abrasion resistance. Further, FIG. 11 shows another example, in which the supporter 20 is integrally formed with the guide plates 26, 26 into a uniform support block 27 by sintering, casting, cold forging, cutting or the like. In this case, the cam 23a is supported by a guide 27a.

Thus constituted supporting structure of the parking rod 19 assembly has an advantage in that the parking rod 19 or the spacer 23 does not come out from between the supporter 20 and parking pawl 21 during assembling, that is, the assembly workability is enhanced. Further, since the guide surfaces are formed by hard material, they are not flawed (such as dent) and as a result smooth motion of the parking rod assembly is ensured.

The cam 23a is loose fitted to the parking rod 19 being biased by the spring 28 and as a result the cam 23a always abuts the end of the spacer 23. This mechanism constitutes so called "parking waiting" mechanism which will be described hereinafter. Further, as shown in FIG. 6, a spring retainer 19b is formed by calking on the parking rod 19. The spring retainer 19b supports the other end of the spring 28.

FIG. 2 shows a state of the parking pawl 21 locking up the secondary pulley 30. In the drawing, the cam 23a contacts a cam follower section 21b provided at one end of the parking pawl 21, pushing the parking pawl 21 upward. Then, the parking pawl 21 rotates clockwise about a pivot 33. As a result, a pawl section 21b provided at the other end of the parking pawl 21 goes down to mesh with the parking gear 31 integrally provided in the secondary pulley 30.

Figure 12:
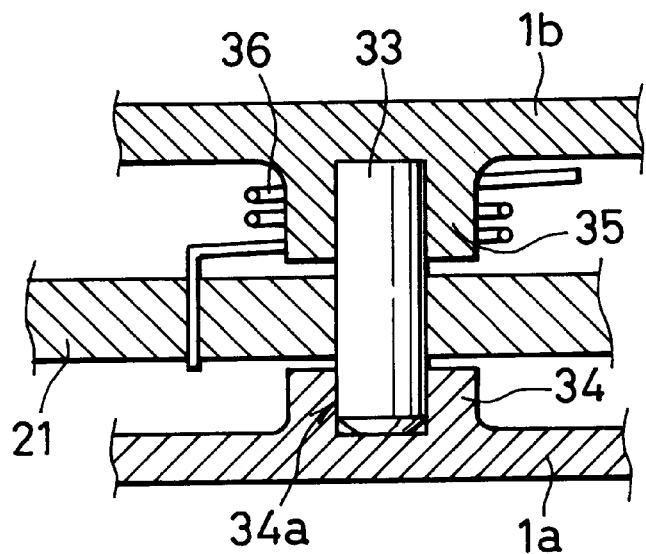
FIG. 12 is an enlarged cross sectional view taken along a line D—D of FIG. 3.

FIG. 12 is a sectional view taken along a line D—D of FIG. 3, showing an installation structure of the parking pawl 21 onto the side case 1b. In the drawing, the pivot 33 is fitted at one end thereof to a boss section 34 provided in the main case 1a and fitted at the other end thereof to a boss section 35 provided in the side case 1b. The parking pawl 21 is rotatably supported by the pivot 33. When assembling both cases 1a, 1b, the parking pawl 21 is incorporated by fitting the pivot 33 to a fitting hole 34a of the boss section 34 while the pivot 33 is fitted to the boss section 35 on the side case 1b side, thereby the assembly workability of the transmission can be enhanced.

Further, the parking pawl 21 is provided with a return spring 36 which is biased in a direction of disengaging the pawl section 21a with the parking gear 31 so as to prevent the pawl section 21a from unnecessarily meshing with the parking gear 31. The return spring 36 is at one end thereof supported by the parking pawl 21 and is at the other end thereof supported by the side case 1b. In this state, the cam follower section 21b of the parking pawl 21 is held down against the spacer 23.

Describing the operation of the parking mechanism 11 thus constituted with reference to FIG. 2, when the select lever 3 is operated, its movement is transmitted to the drive arm 10 through the cable 4 and is converted into the rotational movement of the manual shaft 2 through the drive arm 10. When the manual shaft 2 rotates, the lock arm rotates to move the parking rod 19 in its axial direction. As a result, the spacer 23 secured to the parking rod 19 travels on the supporter 20 in the orthogonal direction of the axis of the secondary pulley 30. When the select lever is selected at a range other than the parking range, the spacer 23 rides on the supporting surface 20b. Accordingly, as shown in broken lines of FIG. 2, the pawl section 21a is held in a detached position from the parking gear 31, thereby the secondary pulley 30 is kept in the unlocking condition.

On the other hand, when the select lever is selected at the parking range, the cam 23a goes up along the slope 20a of the supporter 20 and finally rides on the supporting surface 20b. Then, as shown in solid lines of FIG. 2, the cam 23a pushes the cam follower section 21b of the parking pawl 21 upward against the biasing force of the return spring 36 and the pawl section 21a meshes with the parking gear 31 to produce the lockup condition of the secondary pulley 30.

When the parking pawl 21 operates, there is a case where the pawl section 21a happens to ride just on a tooth crest 31a of the parking gear 31. In such a case, the cam 23b stops halfway on the slope 20a of the supporter 20 due to the blocking force from the tooth crest 31a. Therefore, when the vehicle moves slightly to rotate the parking gear 31, since the blocking force disappears, the cam 23a pushes the cam follower section 21b upward by help of the biasing force of the spring 28 and as a result the pawl section 21a is engaged with the parking gear 31.

Figure 13:
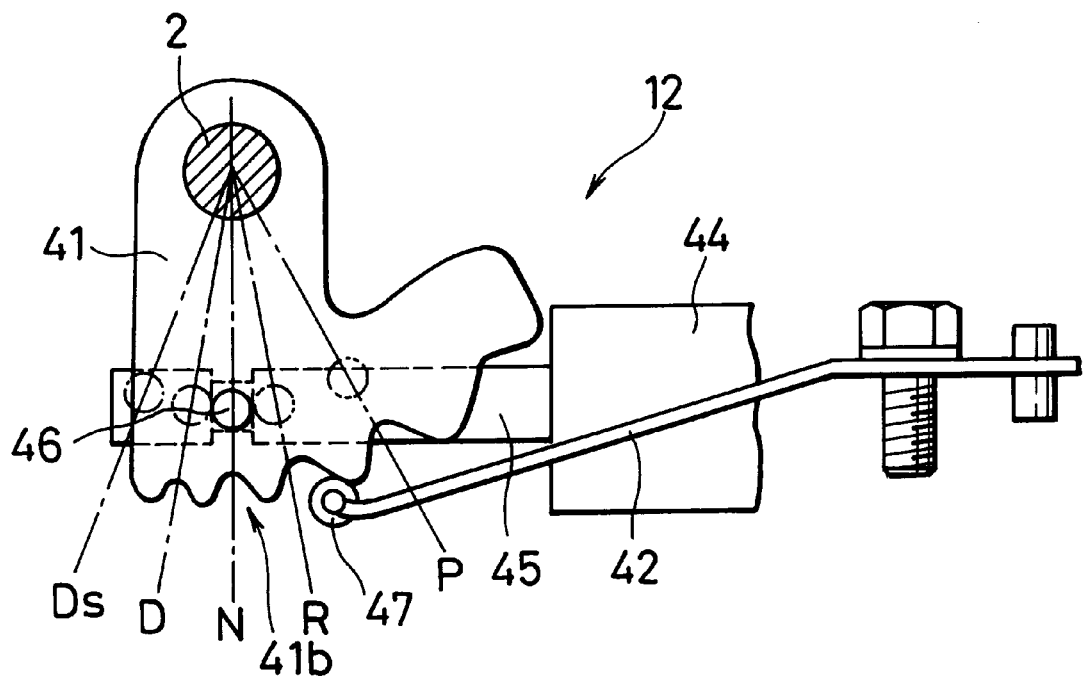
FIG. 13 is an explanatory view showing an operating section of a manual valve and its operation.

Next, describing the manual valve operating section 12 with reference to FIG. 13, the manual valve operating section 12 comprises a manual plate 41 and a detent spring 42 for regulating the operation of the manual plate 41.

The manual plate 41, as shown in FIGS. 2 and 3, is secured at a boss section 41a thereof to the manual shaft 2 by a spring pin 43. Further, the manual plate 41 has a pin 46 which is engaged with a groove formed on a rod 45 of a manual valve 44. When the manual plate is rotated around the manual shaft 2, as shown in FIG. 13, the pin 46 attached to the manual plate 41 moves the rod 45 in its axial direction to change over the manual valve 44.

Further, the manual plate 41 is provided with notches 41b corresponding to respective ranges of P, R, N, D and Ds. Further, the notches 41b are engaged with a roller 47 attached to the end of the detent spring 42 so as to properly position the respective ranges of the manual plate 41.

When the select lever 3 is operated, the manual shaft 2 is rotated and at the same time the manual plate 41 is rotated. Then, the manual plate 41 is set to a range corresponding to the selection of the select lever 3 and the corresponding position of the pin 46 determines a required position of the rod 45 of the manual valve 44.

Figure 14A:
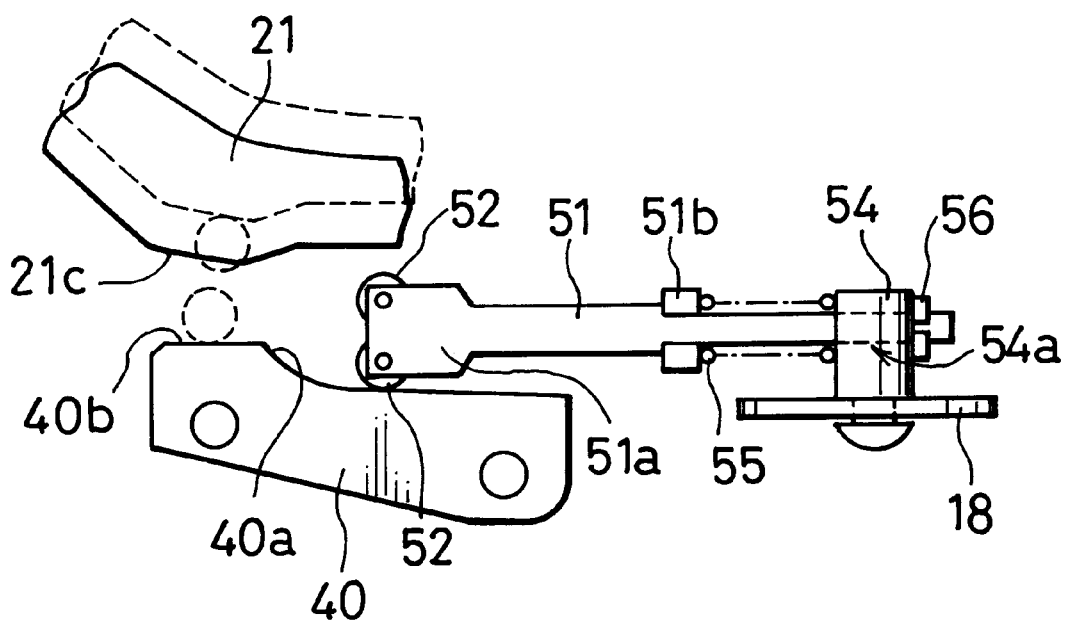
FIG. 14a is an explanatory side view showing a construction of a parking rod employed in a parking apparatus according to a second embodiment of the present invention as viewed from a main case of a continuously variable transmission.
Figure 14B:
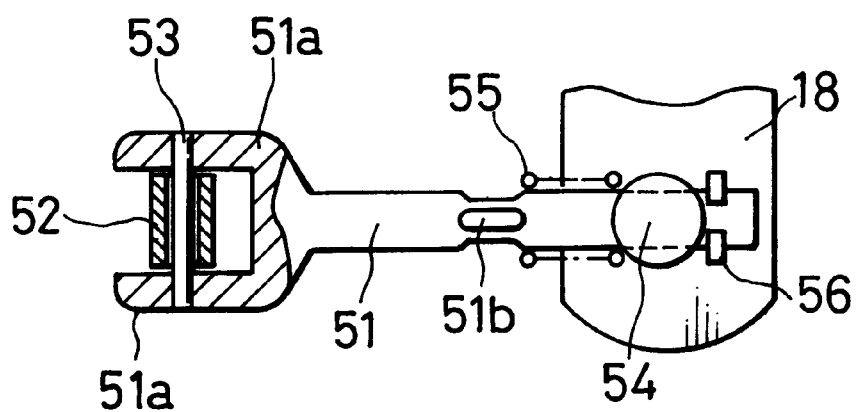

FIGS. 14a and 14b show a parking rod 51 according to a second embodiment. The parking rod 51 has a prong-like configuration. Two rollers 52, 52 are rotatably mounted on shafts 53, 53 press-fitted to two pronged ends 51a, 51a of the parking rod 51 in a parallel relationship with each other. When the parking range is selected, the lower roller 52 rolls along a slope 40a of a supporter 40 and rides on a cam section 40b. Then, the upper roller 52 pushes a cam section 21c of the parking pawl 21 upward to engage the pawl section 21a with the parking gear 31.

The parking rod 51 is loose connected with a boss member 54 which is pivotally connected with the lock arm 18 b. That is, the boss member 54 has a through hole 54a to which the other end of the parking rod 51 is loose fitted to allow swing motion of the parking rod 51 as well as axial motion thereof.

Further, a spring retainer 51b is formed at the intermediate part of the parking rod 51 and a spring 55 is mounted on the parking rod 51 between the spring retainer 51b and the boss member 54. Further, a circlip 56 is applied to the far end of the parking rod 51 on the opposite side of the spring 55 with respect to the boss member 54 to preclude the parking rod 51 from coming out. Thus, a "parking waiting" mechanism according to the second embodiment is accomplished. That is, when the parking pawl 21 is in "parking waiting" state, the pronged ends 51a of the parking rod stops halfway on the slope 20a of the supporter 20.

The parking rod using rollers is capable of reducing larger friction than the one using a sliding cam is, as a result the operating force of the select lever 3 can be reduced.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A parking apparatus of a continuously variable transmission transversely mounted on a vehicle, said transmission having a select lever, a main case, a side case, a manual valve, a primary pulley, a secondary pulley, a power transmitting means for interlocking both pulleys and a parking gear provided in said secondary pulley, comprising:

a manual shaft interconnected with said select lever and provided in a vertical direction of said vehicle substantially on the same plane as that formed by said primary pulley and said secondary pulley;

a parking mechanism provided at an upper portion of said manual shaft and substantially on the same plane as that formed by said primary pulley and said secondary pulley for locking up said secondary pulley; and a manual valve operating mechanism provided at a lower portion of said manual shaft for changing over said manual valve.

2. The parking apparatus according to claim 1, wherein said parking mechanism includes a lock arm connected to said manual shaft and swinging in accordance with the rotation of said manual shaft, a parking rod pivotally connected with said lock arm and reciprocating in an orthogonal direction of a center axis of said secondary pulley in accordance with the swing motion of said lock arm, a spacer having a small diameter and rigidly fitted over said parking rod, a cam tapered on one side thereof, having a large diameter and slidably fitted over said parking rod, a supporter for supporting said spacer and said cam so as to restrict a radial motion of said spacer and said cam, a spring mounted on said parking rod for biasing said cam toward said spacer, a pivot provided in parallel with an axis of said secondary pulley and a parking pawl rocking around said pivot.

3. The parking apparatus according to claim 2, wherein said parking pawl rides on said spacer when said select lever is positioned at a range other than a parking range so as to be disengaged with said parking gear and rides on said cam when said select lever is positioned at the parking range so as to be engaged with said parking gear.

4. The parking apparatus according to claim 2, wherein said cam is supported on one side thereof by a first guide surface provided in said side case and is supported on an opposite side thereof by a second guide surface provided in said main case.

5. The parking apparatus according to claim 2, wherein said pivot is supported at one end thereof by a boss provided in said side case and supported at the other end thereof by a boss provided in said main case.

6. The parking apparatus according to claim 2, wherein said parking pawl has a return spring for automatically disengaging said parking pawl with said parking gear when said select lever is positioned at a range other than the parking range.

7. The parking apparatus according to claim 1, wherein said manual shaft is provided on said side case side.

8. The parking apparatus according to claim 1, wherein said parking mechanism includes a lock arm connected to said manual shaft and swinging in accordance with the rotation of said manual shaft, a boss member pivotally connected with said lock arm, a parking rod slidably supported by said boss member, a first roller rotatably connected with an end of said parking rod, a supporter for supporting said first roller, a second roller rotatably connected with said end of said parking rod in a parallel relationship with said first roller, a spring mounted on said parking rod so as to bias said parking rod toward said end of said parking rod, a first cam section formed on said supporter, a pivot provided in parallel with an axis of said second pulley, a parking pawl rocking around said pivot, and a second cam section formed at one end of said parking pawl.

9. The parking apparatus according to claim 8, wherein said first roller rides on said supporter when said select lever is positioned at a range other than a parking range so as to disengage said parking pawl with said parking gear and said first roller rides on said first cam and at the same time said second roller rides on said second cam when said select lever is positioned at the parking range so as to engage said parking pawl with said parking gear.

* * * * *